(12) United States Patent
Wang

(10) Patent No.: US 7,730,554 B2
(45) Date of Patent: Jun. 8, 2010

(54) DOUBLE DIPPED GLOVES

(75) Inventor: Nicholas Wang, Diamond Bar, CA (US)

(73) Assignee: Encompass Medical Supplies, Inc., Diamond Bar, CA (US)

( * ) Notice: Subject to any disclaimer, the term of this patent is extended or adjusted under 35 U.S.C. 154(b) by 843 days.

(21) Appl. No.: 11/203,921

(22) Filed: Aug. 12, 2005

(65) Prior Publication Data

US 2007/0033704 A1    Feb. 15, 2007

(51) Int. Cl.
  A41D 19/00    (2006.01)
  B29D 22/00    (2006.01)
  B29D 23/00    (2006.01)
  B32B 1/00     (2006.01)
  B32B 27/00    (2006.01)
  B32B 27/08    (2006.01)

(52) U.S. Cl. .............. 2/161.7; 2/159; 2/161.6; 2/168; 2/901; 128/849; 128/878; 428/34.1; 428/35.7

(58) Field of Classification Search ........ 2/168, 2/161.7, 159, 161.6, 901; 128/849, 878; 428/34.1, 35.7
See application file for complete search history.

(56) References Cited

U.S. PATENT DOCUMENTS

| 2,880,189 | A | 3/1959 | Miller et al. |
| 5,014,362 | A | 5/1991 | Tillotson |
| RE35,616 | E | 9/1997 | Tillotson |
| 6,031,042 | A | 2/2000 | Lipinski |
| 6,329,444 | B1 | 12/2001 | McGlothlin |
| 6,369,154 | B1 | 4/2002 | Suddaby |
| 6,451,893 | B1 | 9/2002 | Tao |
| 6,566,435 | B1* | 5/2003 | Teoh et al. ............. 524/432 |
| 2003/0050377 | A1* | 3/2003 | Hagiwara et al. ....... 524/418 |
| 2004/0105943 | A1* | 6/2004 | Hoerner et al. .......... 428/35.7 |
| 2004/0176512 | A1 | 9/2004 | Tao |
| 2004/0231027 | A1 | 11/2004 | Lee |
| 2004/0245670 | A1* | 12/2004 | Janssen et al. .......... 264/236 |
| 2004/0258884 | A1* | 12/2004 | Janssen ................... 428/143 |
| 2004/0262546 | A1 | 12/2004 | Thiess |
| 2005/0002995 | A1 | 1/2005 | Schaller |
| 2005/0113527 | A1* | 5/2005 | Perrella .................. 525/310 |

FOREIGN PATENT DOCUMENTS

| JP | 2004131885 A | * | 4/2004 |
| JP | 2004131885 A | * | 4/2004 |

OTHER PUBLICATIONS

English translation of JP-2004131885-A.*
English translation of JP-2004131885-A, Matsuda, Apr. 2004.*
See Appendix A hereto.

* cited by examiner

*Primary Examiner*—Brent T O'Hern
(74) *Attorney, Agent, or Firm*—Hansen IP Law PLLC

(57) ABSTRACT

A method of making a glove is described. The method comprises dipping a glove form into two different formulations. Each formulation comprises a carboxylated nitrile butadiene rubber with different amounts of covalent and ionic cross linkers. The gloves preferably have a stress retention value of greater than 50%.

19 Claims, 1 Drawing Sheet

DOUBLE DIPPED GLOVES

FIELD OF THE INVENTION

The present invention relates generally to elastomeric constructions, and more particularly, to double-dipped, elastomeric gloves.

BACKGROUND OF THE INVENTION

A variety of elastomeric constructions are known and have numerous applications. One of these applications involves gloves used to protect the hands during different activities, such as cleaning or performing medical procedures. Certain known gloves are manufactured by dipping a glove shaped form into a nitrile butadiene rubber formulation and then curing it.

Gloves are characterized using a number of different performance parameters, such as tensile strength, ultimate elongation, modulus at 300% elongation and stress retention. The composition of the glove nay be varied to obtain the desired performance characteristics. Certain known gloves suffer from an inability to snugly fit the user's hand without becoming uncomfortably restrictive. While certain formulations and manufacturing methods have been developed to address this issue, many of them cannot be reliably used in a commercial setting. In addition, if glove properties such as stress retention are to be adjusted for different applications (e.g. industrial versus medical), changes to the glove formulation are often required. Changing the formulation can be costly and time consuming. Thus, a need has arisen for a glove which addresses the foregoing issues.

SUMMARY OF THE PREFERRED EMBODIMENTS

In accordance with a first aspect of the present invention, a glove is provided which comprises first and second layers. The first layer is preferably formed from a first composition containing a first nitrile butadiene rubber. The second layer is preferably formed from a second composition containing a second nitrile butadiene rubber. The glove preferably exhibits a stress retention of greater than 50%, the stress retention being the percentage retention of the initial stress after six minutes at 100% extension of the glove.

In preferred embodiments, the stress retention ranges from greater than 50% to about 70%. In other preferred embodiments, at least one selected from the first nitrile butadiene rubber and the second nitrile butadiene rubber is carboxylated. In further preferred embodiments, at least one selected from the first composition and the second Composition comprises a metal oxide. In additional preferred embodiments, the metal oxide is at least one selected from the group consisting of magnesium oxide, lead oxide, and zinc oxide.

In still other preferred embodiments, at least one selected from the first composition and the second composition comprises a covalent cross linking agent. In yet further preferred embodiments, the covalent cross linking agent is one selected from the group consisting of sulfur and a sulfur donor compound.

In yet additional preferred embodiments, the first composition comprises zinc oxide in an amount not more than about 0.1 parts per 100 parts of the first nitrile butadiene rubber. In even further preferred embodiments, the amount of zinc oxide present in the first composition ranges from about 0.03 to about 0.08 parts per 100 parts of the first nitrile butadiene rubber.

In additional preferred embodiments, the second composition comprises zinc oxide present in an amount that is at least about 1.0 parts per 100 parts of the second nitrile butadiene rubber. In yet other preferred embodiments, the amount of zinc oxide present in the second composition ranges from about 1.0 to about 1.2 parts per 100 parts of the second nitrile butadiene rubber. In further preferred embodiments, the first composition comprises zinc oxide, the second composition comprises zinc oxide, the amount of zinc oxide present in the first composition is less than the amount of zinc oxide present in the second composition, and the second layer comprises a skin contacting surface for contacting a hand of a wearer of the glove.

In accordance with another aspect of the present invention, an elastomeric construction is provided which comprises a first layer and a second layer. The first layer is preferably formed from a first composition comprising a first nitrile butadiene rubber, a first ionic cross linking agent, and a first covalent cross linking agent. The second layer is preferably formed from a second composition comprising a second nitrile butadiene rubber, a second ionic cross linking agent, and a second covalent cross linking agent. The amount of the first ionic cross linking agent present in the first composition is preferably less than the amount of the second ionic cross linking agent present in the second composition.

In preferred embodiments, at least one selected from the first covalent cross linking agent and the second covalent cross linking agent is sulfur. In other preferred embodiments, at least one selected from the first ionic cross linking agent and the second ionic cross linking agent is a metal oxide. In additional preferred embodiments, the metal oxide is one selected from the group consisting of magnesium oxide, lead oxide, and zinc oxide. In yet further preferred embodiments, the amount of covalent cross linking agent present in the first composition is less than the amount of covalent cross linking agent present in the second composition.

In still other preferred embodiments, the first ionic cross linking agent in the first composition is present in an amount not more than about 0.1 parts per 100 parts of the first nitirile butadiene rubber. In yet additional preferred embodiments, the amount of the first ionic cross linking agent present in the first composition ranges from about 0.03 to about 0.08 parts per 100 parts of the first nitrile butadiene rubber.

In further preferred embodiments, the second ionic cross linking agent in the second composition is present in an amount that is at least about 1.0 parts per 100 parts of the second nitrile butadiene rubber. In even further preferred embodiments, the amount of the second ionic cross linking agent present in the second composition ranges from about 1.0 to about 1.2 parts per 100 parts of the second nitrile butadiene rubber in the second composition.

In accordance with yet another aspect of the present invention, a method of making a glove is provided. The method comprises providing a glove-shaped form and applying a first composition to the form to form a first layer. The first composition preferably comprises a first nitrile butadiene rubber, a first metal oxide, and sulfur. The method further comprises applying a second composition to the first layer, wherein the second composition comprises a second nitrile butadiene rubber, a second metal oxide, and sulfur, thereby forming a second layer.

In preferred embodiments, at least one selected from the first metal oxide and the second metal oxide is selected from the group consisting of magnesium oxide, lead oxide, and zinc oxide. In other preferred embodiments, the first metal oxide in the first composition is present in an amount not more than about 0.1 parts per 100 parts of the first nitrile butadiene rubber. In additional preferred embodiments, the amount of the first metal oxide present in the first composition ranges from about 0.03 to about 0.08 parts per 100 parts of the first nitrile butadiene rubber. In still other preferred embodiments, the second metal oxide is present in an amount that is at least about 1.0 parts per 100 parts of the second nitrile butadiene rubber. In further preferred embodiments, the amount of the second metal oxide present in the second composition ranges from about 1.0 to about 1.2 parts per 100 parts of the second nitrile butadiene rubber.

In yet other preferred embodiments, at least one selected from the first nitrile butadiene rubber and the second nitrile butadiene rubber is carboxylated. In yet further preferred embodiments, the amount of sulfur present in the second composition is less than the amount of sulfur present in the first composition.

In additional preferred embodiments, the amount of sulfur present in the first composition ranges from about 1 to less than about 5 parts per 100 parts of the first nitrile butadiene rubber. In other preferred embodiments, the amount of sulfur present in the second composition ranges from about 3 to about 7 pounds per 100 pound of the second nitrile butadiene rubber. In further preferred embodiments, the amount of sulfur present in the first composition is about 3 parts per 100 parts of the first nitrile butadiene rubber, and the amount of sulfur present in the second composition is about 5 parts per 100 parts of the second nitrile butadiene rubber.

BRIEF DESCRIPTION OF THE DRAWINGS

The invention may be more readily understood by referring to the accompanying drawings in which.

DETAILED DESCRIPTION OF THE PREFERRED EMBODIMENTS

Figure 1:
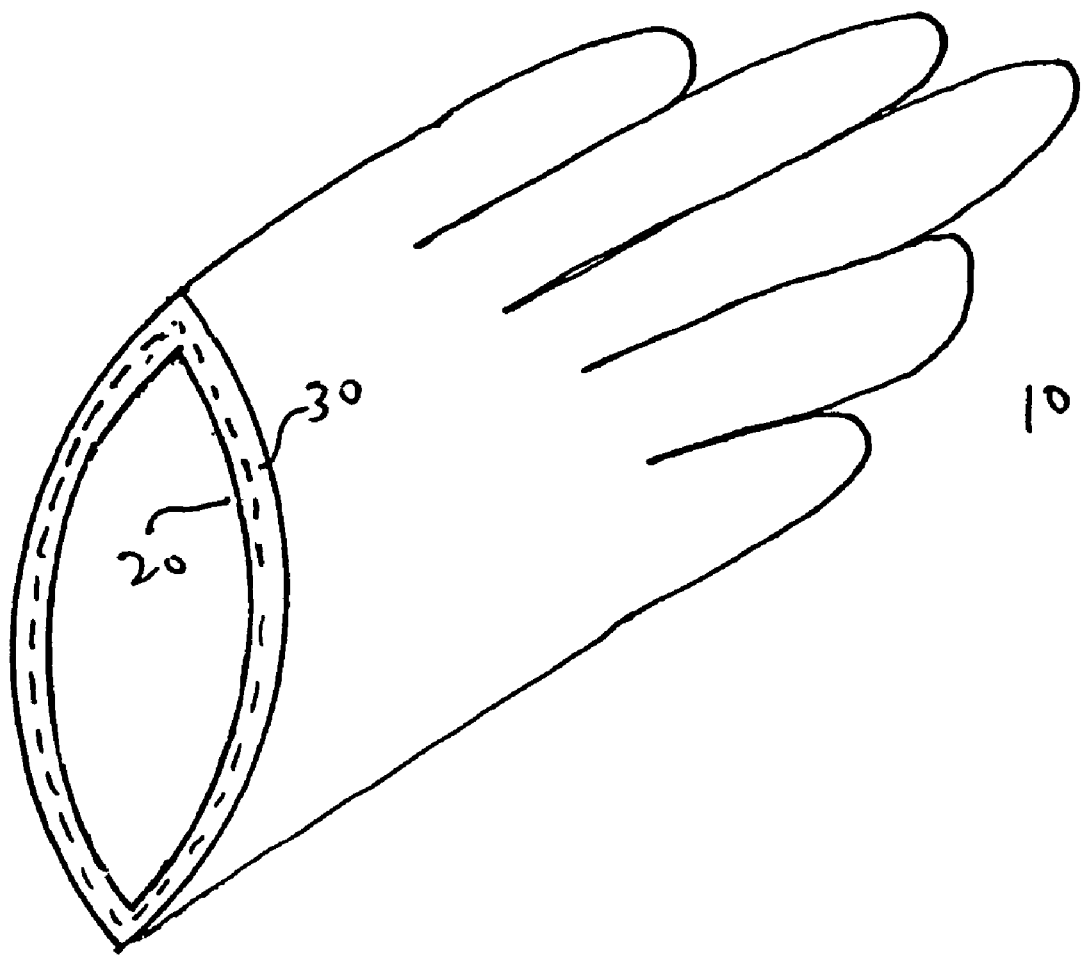
FIG. 1 is a perspective view of a glove prepared in accordance with a preferred embodiment of the present invention.

The present invention is directed to elastomeric formulations and constructions which are especially suited for use in making gloves, in particular, medical and surgical gloves. In accordance with a preferred embodiment of the present invention, an elastomeric formulation is provided which comprises nitrile butadiene rubber or NBR. The NBR materials are preferably a terpolymer of butadiene, acrylonitrile and carboxylic acid monomers, which are also known as carboxylated nitrile butadiene rubbers. It is especially preferred to use carboxylated NBR materials that are produced by a semi-continuous emulsion polymerization process.

The weight percent of butadiene monomer used to form the carboxylated NBR of this preferred embodiment is generally from about 60 to about 80 percent of the total monomer, with weight percentages of from about 65 percent to about 75 percent and from about 70 percent being preferred and more preferred, respectively. The weight percentage of acrylonitrile monomer used to form the carboxylated NBR is generally from about 20 percent to about 40 percent of the total monomer, with weight percentages of from about 25 percent to about 35 percent and about 26 percent being preferred and more preferred, respectively.

The weight percentage of carboxylic acid monomer used to form the carboxylated NBR is generally from about 2 to about 8 percent by weight of total monomer, with weight percentages of from about 2 percent to about 6 percent and from about 3 percent to about 5 percent being preferred and more preferred, respectively. The carboxylic acid monomer component of the carboxylated NBR is preferably methacrylic acid suitable carboxylated NBR materials include Perbunan N latex KA 8250 and KA 8425 (Bayer Corp), Tylac 68-974 and 68-065 (Reichold Chemical) and Nantex 6351 (Nantex Industry Co., Ltd., Taiwan). Nantex 6351 is especially preferred.

Carboxylated NBR contains butadiene sub-units which may preferably be covalently cross linked or "vulcanized." Without wishing to be bound by any theory or limiting the scope of the present invention, it is believed that covalent cross linking improves the chemical and oil resistance of the carboxylated NBR. Thus, the elastomeric formulation of this preferred embodiment also preferably comprises a covalent cross-linker, which is more preferably sulfur or a sulfur donor. Peroxide cross linkers may also be used.

To facilitate covalent cross linking, the elastomeric formulation preferably comprises one or more accelerators which may reduce the time required for covalent cross linking to occur. Suitable accelerators include zinc diethyl dithiocarbamate, zinc 2-mercaptobenzothiazole, zinc dibutyl dithiocarbamate, sodium dibutyl dithiocarbamate, tetramethyl thiuram disulfide, and combinations thereof. Zinc diethyl dithiocarbamate and zinc 2-mercaptobenzothiazole are preferred, and combinations of the two are especially preferred.

The carboxylated sites in carboxylated NBR may preferably be ionically cross linked. Without wishing to be bound by any theory or limiting the scope of the claims in any way, it is believed that ionic cross linking contributes to the tensile strength, puncture resistance, abrasion resistance, and elastic modulus of the carboxylated NBR, while having relatively little effect on its chemical and oil resistance. Thus, in accordance with this preferred embodiment, the elastomeric formulation comprises at least one ionic cross linker, which is preferably a metallic oxide, and more preferably a divalent metallic oxide. Preferred divalent metallic oxides include magnesium oxide, lead oxide, and zinc oxide, with zinc oxide being especially preferred.

The elastomer formulation of this preferred embodiment may also include a pH control agent. The pH is generally between about 8 and about 10, and pH values of about 8.8 to about 9.6 are preferred. Suitable pH control agents include alkali metal hydroxides such as lithium hydroxide, sodium hydroxide and potassium hydroxide, with potassium hydroxide being especially preferred.

The formulation may also include additives commonly used in cured latex products, such as pigments, plasticizers, processing agents, coagulants, and the like. For applications where a non-transparent elastomer construction is desired, titanium dioxide is preferably used as a pigment. Antioxidants may also be used to minimize the oxygen-induced destruction of covalent bonds. 2,2'-methylene-bis-(4-methyl-6-t-butylphenol) is a preferred antioxidant.

Referring to FIG. 1, a preferred embodiment of a method of making a glove in accordance with the present invention will now be described. Clove 10 preferably comprises first layer 30 and second layer 20. Second layer 20 is preferably a skin contacting surface which contacts the wearer's hand when glove 10 is worn. Depending on the application, additional layers not shown in FIG. 1 may also be used. For example, gloves used for high voltage protection such as those used in working on power lines may comprise up to six layers. Although a glove construct is used to illustrate this preferred embodiment, a variety of other elastomeric constructions can be made, including condoms, soother teats, and catheters and the utility of the method is not limited to the manufacture of gloves.

In accordance with this preferred embodiment, a glove form is provided. The form comprises a relatively solid structure in the shape of a glove. The form may be constructed from known materials, such as ceramics. To better ensure that no residue or debris is present on the form, it is preferably first cleaned using known cleaning agents, such as nitric or hydrochloric acids, or basic agents. The form is then preferably dried to remove any residual cleaning agents.

To facilitate film formation, the form is preferably contacted with a coagulant following cleaning and drying. More preferably, the form is dipped into a coagulant. Suitable coagulants include electrolytic solutions, with calcium nitrate solutions being especially preferred. The electrolytic solutions are preferably aqueous. However, alcohol-electrolyte solutions may also be used. The coagulant composition is then preferably dried using known techniques, such as oven drying.

Following the application of the coagulant, a first composition is preferably applied to the form, more preferably by dipping the form into a tank that contains the first composition. The first composition forms first layer 30 of glove 10. The first composition is more preferably a first rubber composition comprising a first nitrile butadiene rubber, such as the carboxylated NBR materials described previously. The components of the first composition are preferably compounded to form a mixture prior to applying the composition to the form using known compounding techniques. In a preferred embodiment, each component of the first composition is sequentially added to the carboxylated NBR while agitating the mixture with a stirrer.

The first composition preferably comprises an ionic cross linker such as the metal oxides mentioned previously. In an especially preferred embodiment, the ionic cross linker is zinc oxide present in an amount that is generally not more than about 0.1 parts per 100 parts of the first NBR. The amount of zinc oxide is preferably from about 0.03 to about 0.08 parts per 100 parts of the first NBR, with an amount of 0.05 parts per 100 parts being more preferred.

The first composition also preferably comprises a sulfur or sulfur-donor covalent crosslinking (i.e. vulcanizing) agent which is present in an amount that generally ranges from about 1 to less than about 5 parts per 100 parts of the first NBR, with amounts ranging from about 2 to about 4 parts per 100 parts of the first NBR being preferred. A sulfur amount of about 3 parts per 100 parts of the first NBR is especially preferred. To further facilitate the formation of covalent cross links, the first composition preferably comprises one or more accelerating agents. In an especially preferred embodiment, zinc diethyl dithiocarbamate and zinc 2-mercaptobenzothiazole accelerating agents are used. The zinc diethyl dithiocarbamate is preferably present in an amount ranging generally from about 0.4 to about 1.2 parts per 100 parts of the first nitrile butadiene rubber, with amounts ranging from about 0.6 to about 1.0 being preferred and an amount of about 0.8 parts per 100 parts being especially preferred. The zinc 2-mercaptobenzothiazole accelerator is preferably present in an amount ranging generally from about 0.3 to about 1.1 parts per 100 parts of the first NBR, with amounts of from about 0.5 to about 0.9 parts per 100 parts of the first NBR being preferred. An amount of about 0.7 parts per 100 parts of the first NBR is especially preferred.

In accordance with this preferred embodiment, a non-transparent elastomeric construct is provided. Thus, the first composition preferably comprises a pigment, which in more preferably titanium dioxide. The amount of titanium dioxide is preferably from 0.0 to about 2.0 parts per hundred parts of the first NBR, with a range of from about 0.3 to about 0.7 pounds per hundred pounds being more preferred. The first composition also preferably comprises an antioxidant, which is preferably 2-2'-methylene-bis-(4-methyl-6-t-butylphenol). The antioxidant is preferably present in an amount ranging from about 0.3 to about 0.7 pounds per hundred pounds of the first NBR. After the first rubber composition in applied to the form, it is preferably allowed to coagulate and form a wet gel on the form in a gelation step. The wet gel then comprises first glove layer 30.

After gelation, a second composition, which is preferably a rubber composition comprising a carboxylated NBR, is applied to the first layer. The second composition forms second layer 20 of glove 10. The components of the second composition are preferably compounded to form a mixture prior to applying the composition to the form using known compounding techniques in the manner described above for the first layer 30. The second is preferably applied by dipping the form and first layer 30 into a tank containing the second composition.

Like the first composition, the second composition preferably comprises an ionic cross linker such as the metal oxides mentioned previously. In an especially preferred embodiment, the ionic cross linker is zinc oxide present in an amount that is generally at least about 1.0 parts per 100 parts of the second NBR in the second composition. The amount of zinc oxide is preferably from about 1.0 to about 1.2 parts per 100 parts of the second NBR, with an amount of 1.05 parts per 100 parts being more preferred.

The second composition also preferably comprises a sulfur or sulfur donor covalent crosslinking (i.e. vulcanizing) agent which is present in an amount that generally ranges from about 3 to about 7 parts per 100 parts of the second NBR, with amounts ranging from about 4 to about 6 parts per 100 parts of the second NBR being preferred. A sulfur amount of about 5 parts per 100 parts of the second NBR is especially preferred. To further facilitate the formation of covalent cross links, the second composition preferably comprises one or more accelerating agents. In an especially preferred embodiment, zinc diethyl dithiocarbamate and a zinc 2-mercaptobenzothiazole accelerating agents are used. The zinc diethyl dithiocarbamate and zinc 2-mercaptobenzothiazole are preferably present in equal amounts, which are generally from about 0.3 to about 0.7 parts per 100 parts of the second NBR, with amounts ranging from about 0.4 to about 0.6 parts per 100 parts of the second NBR being preferred and an amount of about 0.5 parts per 100 parts of the second NBR being especially preferred.

As with the first composition, to provide a non-transparent elastomeric construct, the second composition preferably comprises a pigment, which is more preferably titanium dioxide present in the same amounts described above with respect to the first layer. The second composition also preferably comprises an antioxidant, which is preferably 2-2'-methylene-bis-(4-methyl-6-t-butylphenol). The antioxidant is preferably present in the same amounts described above with respect to the first composition.

Following the application of the second composition, the second compound is allowed to gel in a gelation step such as the one described above with respect to first glove layer 30. After the second composition is applied, the glove is in a wet gel state. The wet gel is preferably leached with water to remove any residual coagulant and other water soluble materials or impurities from the latex film.

The dual-layer, wet gel glove construction is then preferably cured (vulcanized) to cross link the butadiene sub-units in the first and second rubber compositions. It is especially preferred to apply both the first and second rubber compositions prior to curing. Curing is preferably performed by placing the layered form into an oven for a predetermined time at a predetermined temperature or series of temperatures.

A variety of different curing times and temperatures can be used depending on the desired degree of cross linking. In one preferred embodiment, the curing time ranges from about 10 to about 15 minutes. For this range of curing times, a curing temperature ranging from about 250° F. to about 350° F. is preferred, with ranges of from about 270° F. to about 330° F. and from about 290° F. to about 310° F. being more preferred and especially preferred, respectively. In another preferred embodiment, the curing time ranges from about 20 minutes to about 40 minutes. For this range of curing times, a curing temperature of from about 200° F. to about 260° F. is preferred, with ranges of from about 220° F. to about 240° F. and from about 225° F. to about 235° F. being more preferred and especially preferred, respectively.

Following the curing step, the glove is preferably leached with water and then stripped from the form. Because the glove may be tacky or sticky, if desired, surface treatments such as powdering and chlorination may also be applied to the glove to facilitate stripping from the form. As a result of the stripping process, glove 10 is turned inside out. As depicted in FIG. 1, first layer 30, which was proximate the surface of the form during dipping, is the outermost layer, and second layer 20 is the inner most layer with respect to the wearer's hand.

Gloves prepared in accordance with this preferred embodiment preferably have a stress retention of greater than 50 percent. As defined herein, the term "stress retention" refers to the stress applied to a glove specimen (or other elastomeric construct specimen) prepared in accordance with ASTM D412-98a 6 minutes after the specimen is stretched 100% of its original length, as a percentage of the initial stress caused by the stretching. Thus, if a specimen is stretched from an initial length of 7 inches to a length of 14 inches, an initial stress, $\sigma_i$ will develop. After 6 minutes, the stress will equal $\sigma_{6\ min}$. Thus, the stress retention will equal:

$$(\sigma_{6\ min}/\sigma_i) \times 100$$

At a constant stretch, a stress retention of less than 100% indicates that the material begins to relax, thereby decreasing the stress. As a result, when the glove is worn, it is initially relatively tight fitting, but after a period of time, loosens to relieve the pressure applied to the user's hands. The stress retention of gloves prepared in accordance with this preferred embodiment ranges from about 50% to about 70%, with stress retentions of from about 55% to about 65% being more preferred. It is believed that these preferred stress retention values provide a glove which remains snugly fit without being uncomfortably restrictive.

By providing two layers 20 and 30, the method of this preferred embodiment allows the glove properties to be varied by varying the relative amounts of first layer 30 and second layer 20. For example, by varying the relative amounts of first layer 30 and second layer 20, the stress retention of glove 10 may be tuned to a particular desired value. The relative amounts of the first layer 30 and the second layer 20 are preferably adjusted by varying the dipping times used for the application of the first and second rubber compositions. If the amount of the first layer 30 is relatively higher than the amount of the second layer 20, glove 10 will tend to be softer with a higher stress retention. However, if the amount of the second layer 20 is relatively higher than the amount of the first layer 30, glove 10 will tend to be stronger with a relatively lower stress retention. For example, if a relatively soft glove is desired, first layer 30 may comprise about 70 percent by weight of glove 10, while second layer 20 may comprise about 30 percent by weight of glove 10. In contrast, if a tougher glove is desired (e.g. for heavy duty industrial applications), first layer 30 may comprise about 30 percent by weight of glove 10, and second layer 20 may comprise about 70 percent by weight of glove 10.

As is known to those skilled in the art, medical gloves sold in the United States are subject to certain restrictions in the amount of defects (e.g., holes) that the gloves may contain. For medical examination gloves, the Food and Drug Administration's acceptable quality level (AQL) is 2.5. For industrial gloves, the AQL is 4.0. Gloves prepared in accordance with the double dipping process of this preferred embodiment will typically have fewer defects than those produced via a single dipping process (i.e., a process wherein the glove form is only dipped into a rubber composition once), and will preferably have defect rates of less than about 10 percent, with rates of less than about 8 percent and less than about 1 percent being more preferred and especially preferred, respectively.

Gloves prepared in accordance with this preferred embodiment also preferably have a tensile strength (as measured in accordance with ASTM D412-98a) of greater than 14 MPa, with tensile strengths of from about 15 MPa to about 25 MPa and from about 16 MPa to about 22 MPa being preferred and more preferred, respectively. They further have an ultimate elongation (as measured in accordance with ASTM D412-98a) that is generally greater than 500%, with ultimate elongation values of from 550% to about 650% and from about 580% to about 620% being preferred and more preferred, respectively.

Set forth below in Table 1 are examples of a first rubber composition and a second rubber composition which are suitable for use with the method of this preferred embodiment. All amounts are expressed as parts of the listed component per 100 parts of NBR in the respective layer:

TABLE 1

| Component | First Layer | Second Layer |
| --- | --- | --- |
| Carboxylated NBR | 100 | 100 |
| 2-2'methylene-bis-(4-methyl-6-t-butylphenol) | 0.5 | 0.5 |
| zinc oxide | 0.05 | 1.05 |
| zinc diethyl dithiocarbamate | 0.8 | 0.5 |
| zinc 2-mercaptobenzothiazole | 0.7 | 0.5 |
| sulfur | 3.0 | 5.0 |
| titanium dioxide | 0.5 | 0.5 |
| potassium hydroxide | 1.0 | 1.0 |

Gloves formed from the first layer alone showed a good stress retention of approximately 65%. However, they tended to split during the wet gel stage of production due to insufficient gel strength, making them poor candidates for commercial production. Conversely, gloves formed from the second layer alone had sufficient gel strength, but had stress retention values of approximately 51%. As a result, small variations in process conditions were more likely to cause the stress retention to fall below 50%, again making the gloves poor candidates for commercial production. However, as indicated by the data below, gloves comprising a first layer formed from the first composition and a second layer formed from the second composition showed repeatably good stress retention values while still possessing sufficient gel strength for commercial production.

Set forth below in Table 2 are performance characteristics of six (6) films, each of which comprises the two layers and their respective compositions set forth in Table 1. In the data presented below, the first layer 30 comprises about 60 percent to about 65 percent of the total weight, whereas second layer 20 comprises about 35 percent to about 40 percent of the total weight.

The stress retention values were determined as set forth above. The 300% modulus, tensile strength, and ultimate elongation were determined in accordance with ASTM D 412-98a.

| Film No. | Modulus 300% (MPa) | Tensile Strength (MPa) | Ultimate Elongation (%) | Stress Retention (%) |
|---|---|---|---|---|
| 1 | 3.2 | 16.1 | 570.0 | 54.0 |
| 2 | 3.0 | 15.4 | 560.0 | 57.0 |
| 3 | 2.7 | 22.8 | 600.0 | 63.0 |
| 4 | 3.5 | 19.4 | 590.0 | 61.0 |
| 5 | 3.2 | 15.2 | 580.0 | 57.0 |
| 6 | 3.2 | 22.7 | 600.0 | 59.0 |

As the data indicates, gloves prepared using the dual layer composition set forth in Table 1 repeatably achieved stress retention values of over 50%. As a result, the method of this preferred embodiment is well suited for commercial production where the amount of off specification products must be minimized.

The embodiments described above are exemplary embodiments of a the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A glove, comprising:
   a first layer formed from a first composition comprising a first nitrile butadiene rubber; and
   a second layer formed from a second composition comprising a second nitrile butadiene rubber;
   wherein the glove exhibits a stress retention of greater than 50%, said stress retention being the percentage retention of the initial stress after six minutes at 100% extension of the glove, the first nitrile butadiene rubber composition comprises a first amount of a metal oxide ionic cross-linking agent, the second nitrile butadiene rubber composition comprises a second amount of the metal oxide ionic cross-linking agent, the first amount of the metal oxide ionic cross-linking agent present in the first nitrile butadiene rubber composition is less than the second amount of the metal oxide ionic cross-linking agent present in the second nitrile butadiene rubber composition, the first nitrile butadiene rubber composition further comprises a first amount of a covalent cross-linking agent, the second nitrile butadiene rubber composition further comprises a second amount of the covalent cross-linking agent, the first amount of the covalent cross-linking agent present in the first nitrile butadiene rubber composition is less than the second amount of the covalent cross-linking agent present in the second nitrile butadiene rubber composition, and the glove has a tensile strength of from about 15 MPa to about 25 MPa and an ultimate elongation of from about 550% to about 650%.

2. The glove of claim 1, wherein the stress retention ranges from greater than 50% to about 70%.

3. The glove of claim 1 wherein either or both of the first nitrile butadiene rubber and the second nitrile butadiene rubber is carboxylated.

4. The glove of claim 1, wherein the metal oxide is at least one selected from the group consisting of magnesium oxide, lead oxide, and zinc oxide.

5. The glove of claim 1, wherein the metal oxide is zinc oxide.

6. The glove of claim 1, wherein the covalent cross linking agent is selected from the group consisting of sulfur, a sulfur-donor compound, and a peroxide compound.

7. The glove of claim 1, wherein the metal oxide is one selected from the group consisting of magnesium oxide, lead oxide, and zinc oxide.

8. The glove of claim 1, wherein the metal oxide ionic cross-linking agent is zinc oxide, and the first amount of the zinc oxide present in the first composition is not more than about 0.1 parts per 100 parts of the first nitrile butadiene rubber.

9. The glove of claim 8, wherein the amount of zinc oxide present in the first composition ranges from about 0.03 to about 0.08 parts per 100 parts of the first nitrile butadiene rubber.

10. The glove of claim 8, wherein the second amount of the zinc oxide present in the second composition is at least about 1.0 parts per 100 parts of the second nitrile butadiene rubber.

11. The glove of claim 10 wherein the amount of zinc oxide present in the second composition ranges from about 1.0 to about 1.2 parts per 100 parts of the second nitrile butadiene rubber.

12. The glove of claim 1, wherein the metal oxide ionic cross-linking agent is zinc oxide and the first layer comprises a skin contacting surface for contacting a hand of a wearer of the glove.

13. The glove of claim 1, wherein the first nitrile butadiene rubber is prepared from a monomer precursor comprising butadiene, a carboxylic acid, and acrylonitrile, wherein the amount of butadiene in the monomer precursor is from about 60 percent to about 80 percent by weight of the monomer precursor, the amount of carboxylic acid in the monomer precursor is from about 2 percent to about 8 percent by weight of the monomer precursor, and the amount of acrylonitrile in the monomer precursor is from about 20 to about 40 percent by weight of the monomer precursor.

14. The glove of claim 13, wherein the carboxylic acid is methacrylic acid.

15. The glove of claim 1, wherein the first nitrile butadiene rubber composition differs from the second nitrile rubber butadiene composition.

16. The glove of claim 1 consisting of two layers, wherein the first layer is formed from the first composition and comprises a skin contacting surface, the second layer is formed from the second composition, and
   the second layer contacts the first layer.

17. The glove of claim 16, wherein the metal oxide ionic cross linking agent is zinc oxide, the first amount of the zinc oxide present in the first composition is from about 0.03 to about 0.08 parts per 100 parts of the first nitrile butadiene rubber, the second amount of the zinc oxide present in the second composition is from about 1.0 to about 1.2 parts per 100 parts of the second nitrile butadiene rubber, the covalent cross linking agent comprises sulfur, the first amount of the sulfur present in the first composition is from about 1 to less than about 5 parts per 100 parts of the first nitrile butadiene rubber, the second amount of the sulfur present in the second composition is from 3 to about 7 parts per 100 parts of the second nitrile butadiene rubber, and the glove exhibits a stress retention of greater than 50%, said stress retention being the percentage retention of the initial stress after six minutes at 100% extension of the glove.

18. The glove of claim 17, further comprising at least one accelerating agent.

19. The glove of claim 17, wherein the at least one accelerating agent comprises zinc diethyl dithiocarbamate and zinc 2-mercaptobenzothiazole.

* * * * *